UNITED STATES PATENT OFFICE.

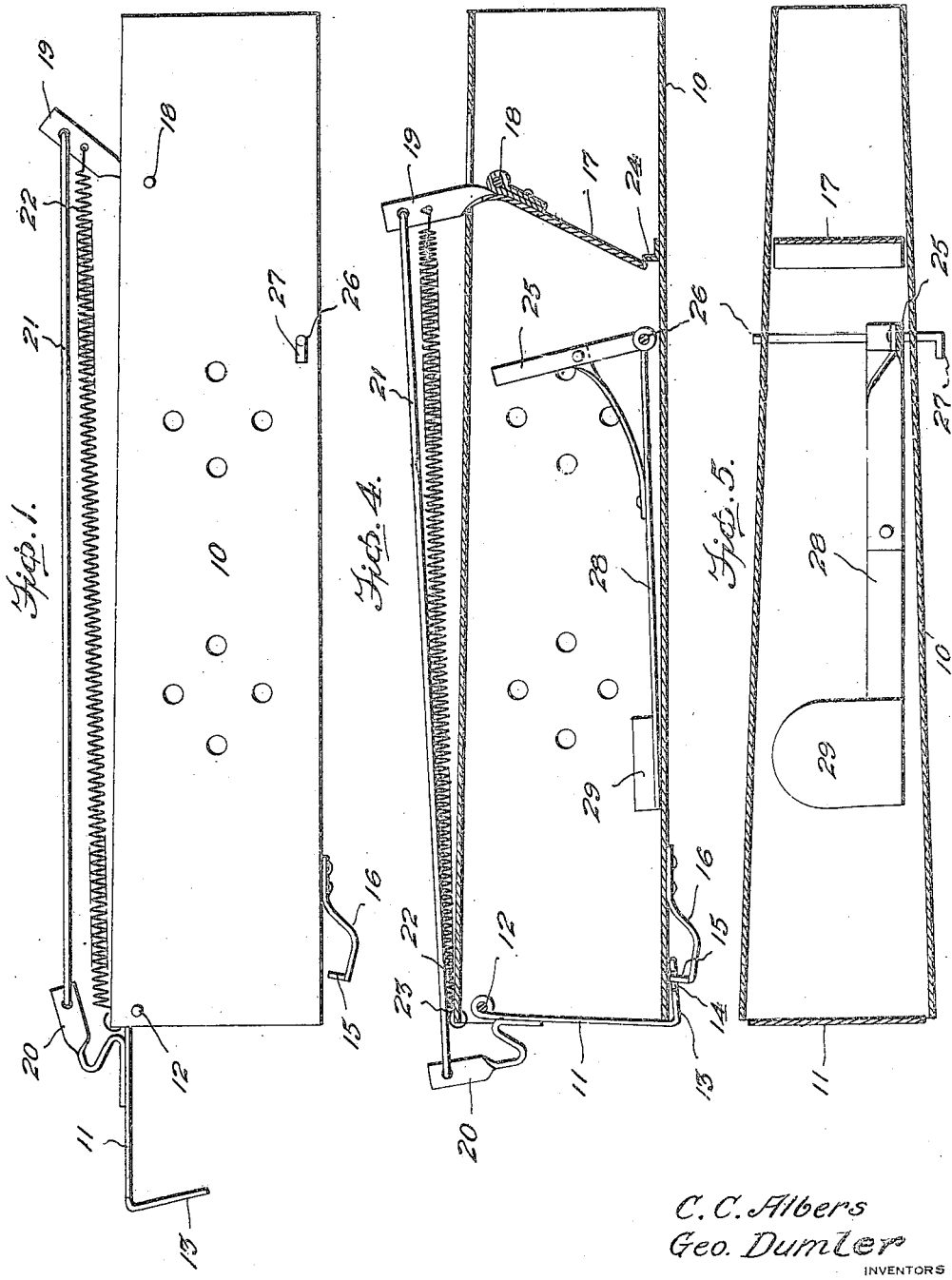

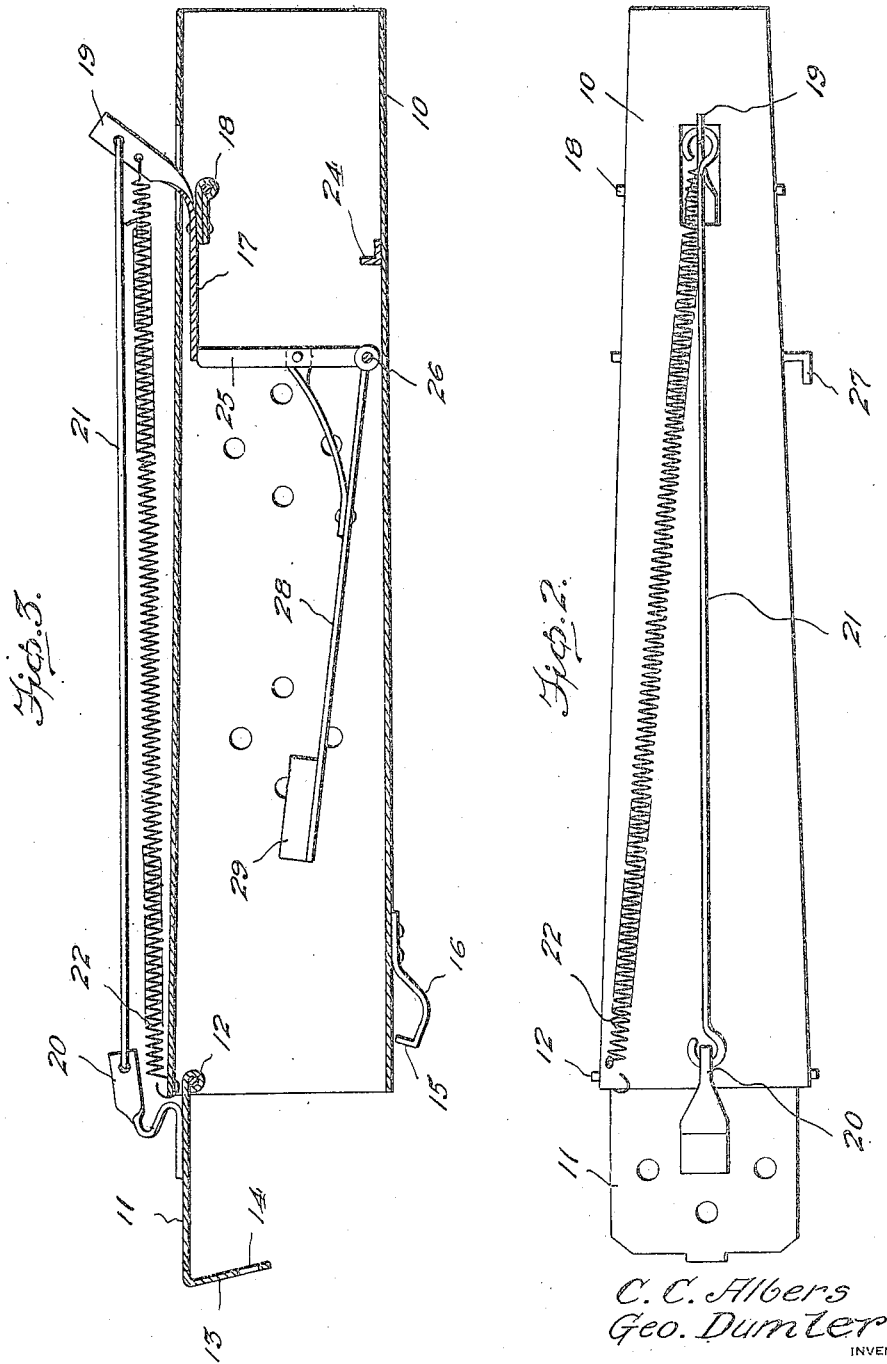

CLINTON C. ALBERS AND GEORGE DUMLER, OF HARGRAVE, KANSAS.

TRAP.

1,372,663.　　　Specification of Letters Patent.　　Patented Mar. 29, 1921.

Application filed March 26, 1920. Serial No. 368,956.

*To all whom it may concern:*

Be it known that we, CLINTON C. ALBERS and GEORGE DUMLER, citizens of the United States, residing at Hargrave, in the county of Rush and State of Kansas, have invented new and useful Improvements in Traps, of which the following is a specification.

This invention relates to animal traps and has for an object the provision of a trap, which may be used either with or without bait.

Another object of the invention is the provision of a trap in which the animal entering the same will contact with a trigger carried arm, to close said trap and to lock the same in closed position to prevent the escape of the animal.

Another object is the provision of an animal trap having an entrance opening at each end and provided with spring actuated simultaneously operated closures, so that the animal may enter at either end and both openings close to prevent its escape.

Other objects and advantages will appear as the following description is read in connection with the accompanying drawings:—

In the drawings:—

Figure 1 is a side elevation of a trap constructed in accordance with the present invention and shown "set."

Fig. 2 is a plan view of the same.

Fig. 3 is a longitudinal vertical sectional view with the parts in the position shown in Fig. 1.

Fig. 4 is a similar view showing the trap "sprung."

Fig. 5 is a horizontal section.

Referring to the drawings in detail, wherein like characters of reference denote corresponding parts throughout the several views, the trap as herein described and illustrated, comprises an elongated casing 10, of preferably rectangular cross section. This casing is open at each end as shown and one of its ends is adapted to be closed by a door or closure 11, which is preferably secured to the end of the trap as shown at 12. This door is provided with an arm 13, having an opening 14 in its outer extremity which opening is adapted to be engaged by the inwardly extending extremity 15 of a spring catch 16 secured to the bottom of the casing 10.

The opposite end of the trap is provided with a door or closure 17, which is spaced inwardly from the adjacent end of the trap and is pivotally mounted as indicated at 18. Extending from the door or closure 17 is an arm 19, while an arm 20 also extends from the door or closure 11. The arms 19 and 20 are connected by a rod 21 to provide for the simultaneous pivotal movement of the closures 11 and 17. The closures 11 and 17 are normally held in closed position by means of a spring 22, one end of this spring being secured to the arm 19 of the closure 17 and the opposite end being secured to the casing as shown at 23. The inward movement of this last mentioned closure is limited by contact with the edge of the casing 10, while the stop 24 is located in the path of the closure 17 for the purpose of limiting the movement in one direction.

For the purpose of holding the closures in open position to set the trap, there is provided a trigger 25. This trigger is secured to a transversely extending rod or shaft 26 which is mounted in suitable bearings in the casing 10, and one end of this rod is provided with an extension 27 upon the outside of the casing to move the trigger upon its pivot. Extending from the trigger 25 is an arm 28, which is provided upon its free end with an enlargement or weight 29.

An animal entering the trap will contact with the enlargement or weight 29 so as to disengage the trigger 25 from the closure 17 and permit of a movement of the parts from the position shown in Fig. 3 to the position shown in Fig. 4, so that both entrances of the trap will be simultaneously closed and the escape of the animal prevented. To set the trap, the doors or closures are swung upward by pressing downward upon the arm 19 against the action of the spring 22 and by moving the trigger 25 into position beneath the closure 17 by means of the arm 27, whereupon the trap will be ready for use. The invention is susceptible of various changes in its form, proportions and minor details of construction and the right is herein reserved to make such changes as properly fall within the scope of the appended claims.

Having thus described our invention what we claim as new is:—

1. An animal trap comprising a receptacle open at each end, spring actuated closures for said ends, an arm carried by each of said closures, a rod connecting said arms to provide for their simultaneous operation to move the closures in the same direction to open or close the trap and a trigger located within the trap and engageable with one of said closures to hold both closures in open position.

2. An animal trap comprising a receptacle open at each end, spring actuated closures for said ends, means for connecting said closures to provide for their simultaneous opening and closing, a trigger located within the trap and engageable with one of said closures, to hold both closures in open position and a single spring catch engageable with one closure to hold both closures in closed position.

3. An animal trap comprising a receptacle open at each end, spring actuated closures for said ends, means for connecting said closures to provide for their simultaneous operation, an upwardly extending trigger pivoted within the receptacle and engageable with one of the closures to hold both closures in open position and an arm extending from said trigger for contact with an animal entering the trap to release the trigger and close the doors.

In testimony whereof we affix our signatures.

CLINTON C. ALBERS.
GEORGE DUMLER.